United States Patent
Finkelstein (10) Patent No.: US 10,862,153 B2
(45) Date of Patent: Dec. 8, 2020

(54) HIGH-POWER REDOX FLOW BATTERY BASED ON THE $CR^{III}/CR^{VI}$ REDOX COUPLE AND ITS MEDIATED REGENERATION

(71) Applicant: Chrome Plated Power LLC, Wilmington, DE (US)

(72) Inventor: David Alan Finkelstein, Basel (CH)

(73) Assignee: Chrome Plated Power LLC, Wilmington, DE (US)

( * ) Notice: Subject to any disclaimer, the term of this patent is extended or adjusted under 35 U.S.C. 154(b) by 162 days.

(21) Appl. No.: 15/737,006

(22) PCT Filed: Jun. 16, 2016

(86) PCT No.: PCT/EP2016/063943
§ 371 (c)(1),
(2) Date: Dec. 15, 2017

(87) PCT Pub. No.: WO2016/202950
PCT Pub. Date: Dec. 22, 2016

(65) Prior Publication Data
US 2018/0366758 A1    Dec. 20, 2018

(30) Foreign Application Priority Data
Jun. 16, 2015 (EP) ..................................... 15020098

(51) Int. Cl.
*H01M 8/18* (2006.01)
*H01M 4/92* (2006.01)
(Continued)

(52) U.S. Cl.
CPC ........... *H01M 8/188* (2013.01); *H01M 4/921* (2013.01); *H01M 4/96* (2013.01); *H01M 8/083* (2013.01); *Y02E 60/528* (2013.01)

(58) Field of Classification Search
CPC .............................. H01M 8/188; H01M 4/921
See application file for complete search history.

(56) References Cited

U.S. PATENT DOCUMENTS

2010/0112393 A1* 5/2010 Knuckey ................. C07F 17/02
                                                                429/476
2010/0279182 A1   11/2010 Takahashi
(Continued)

FOREIGN PATENT DOCUMENTS

CN    1893162 A    1/2007
DE    914624 C     6/1954
(Continued)

OTHER PUBLICATIONS

Ahmed et al., "Electrochemical Chonic Acid Regeneration Process With Fuel-Cell Electrode Assistance. Part I: Removal of Contaminants", Journal of Applied Electrochemistry 31: 1821-1387 (2001).
(Continued)

*Primary Examiner* — Jonathan G Jelsma
(74) *Attorney, Agent, or Firm* — Troutman Pepper Hamilton Sanders LLP (57) ABSTRACT

This invention describes a high-power, high-energy oxidant (catholyte) chemistry based on dichromate ($Cr^{VI}$ as $Cr_2O_7^{2-}$) for use with a variety of fuels (anolytes) in redox flow batteries (RFBs, also known as reversible fuel cells), which reversibly store electricity as chemical energy. The reduction (discharge) of $Cr_2O_7^{2-}$ to $Cr^{3+}$ is natively irreversible at all investigated solid-state electrocatalysts, which has historically limited the employment of $Cr_2O_7^{2-}$ to primary (non-rechargeable) cells, such as Grenet cells. The described invention overcomes this limitation by using a reversible redox couple, hereafter electron mediator, to heterogeneously donate electrons to the cathode electrocatalyst and homogeneously accept electrons from $Cr^{3+}$ to regenerate $Cr_2O_7^{2-}$. RFBs employing this energy- and power-dense chemistry are suitable for low-cost energy storage applications, ranging from grid-level storage of renewable electricity to consumer electronics.

14 Claims, 5 Drawing Sheets

(51) Int. Cl.
*H01M 4/96* (2006.01)
*H01M 8/083* (2016.01)

(56) References Cited

U.S. PATENT DOCUMENTS

| | | | |
|---|---|---|---|
| 2011/0014532 A1* | 1/2011 | Knuckey | H01M 4/9008 |
| | | | 429/416 |
| 2011/0039164 A1 | 2/2011 | Akers et al. | |
| 2014/0178735 A1 | 6/2014 | Wang et al. | |
| 2014/0272483 A1* | 9/2014 | Pham | H01M 8/04276 |
| | | | 429/51 |
| 2015/0017494 A1 | 1/2015 | Amstutz et al. | |

FOREIGN PATENT DOCUMENTS

| | | | | |
|---|---|---|---|---|
| FR | 2431196 A1 | | 2/1980 | |
| GB | 2030349 A | * | 4/1980 | H01M 2/1673 |
| GB | 2030349 A | | 4/1980 | |
| JP | 55524389 A | | 2/1980 | |
| JP | 2006019279 A | | 1/2006 | |
| JP | 2009544131 A | | 12/2009 | |
| JP | 2010516017 A | | 5/2010 | |
| JP | 2011510466 A | | 3/2011 | |
| JP | 2013543056 A | | 11/2013 | |
| JP | 2014524124 A | | 9/2014 | |
| JP | 2015509650 A | | 3/2015 | |
| WO | 2012049494 A1 | | 4/2012 | |
| WO | 2013131838 | | 9/2013 | |

OTHER PUBLICATIONS

Bard et al., "Electrochemical Methods" Fundamentals and Applications, 2nd Edition (Wiley 2001), pp. 1-850.
Finkelstein et al., "Alternative Oxidants for High-Power Fuel Cells Studied by Rotating Disk Electrode (RDE) Voltammetry at Pt, Au, and Glassy Carbon Electrodes", The Journal of Physical Chemistry (2011) 115, 6073-6084.
Finkelstein et al., "Self-Poisoning During BH4 Oxidation at Pt and Au, and in Situ Poison Removal Procedures for BH4—Fuel Cells", The Journal of Physical Chemistry (2013) 117, 1571-1581.
Office Action for Japanese Application No. 2018-517480 dated Feb. 10, 2020.
Ponce de Leon et al., "Redox Cells for Energy Conversion", Journal of Power Sources, 160 (2016) pp. 716-732.
Office Action and Search Report for Chinese Patent Application No. 201680034951.8 dated Jun. 18, 2020.

* cited by examiner

| Catalyst | $E_{1/2}$ at 5mM, 3000rpm (V vs. Ag/AgCl) |
|---|---|
| Au | 0.63 |
| Ag | 0.43 |
| Pd | 0.23 |
| GC | -0.07 |
| Pt | -0.10 |
| Ni | -0.19 |

HIGH-POWER REDOX FLOW BATTERY BASED ON THE $Cr^{III}/Cr^{VI}$ REDOX COUPLE AND ITS MEDIATED REGENERATION

CROSS REFERENCE TO RELATED APPLICATION

This present application is a U. S. national stage filing under 35 U.S.C. § 371 of International Application No. PCT/EP2016/063943, filed Jun. 16, 2016, which claims priority to EP Patent Application Serial No. 15020098.8, filed Jun. 16, 2015 the disclosures of which are herein incorporated by reference in-their entireties.

BACKGROUND OF THE INVENTION

Field of the Invention

The invention describes novel redox flow battery systems, which are electrochemical cells used for electricity storage.

Description of the Related Art

Figure 1:
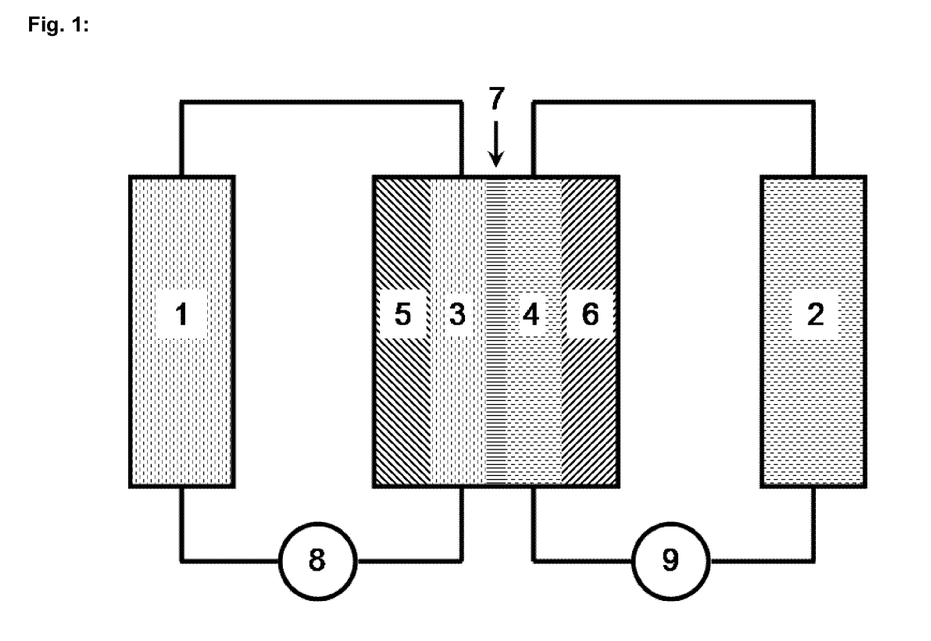
FIG. 1: Schematic illustration of a redox flow battery comprising (1) anolyte storage tank; (2) catholyte storage tank; (3) anolyte chamber; (4) catholyte chamber; (5) anode; (6) cathode; (7) selectively permeable ion-conducting membrane; (8) pump for anolyte; and (9) pump for catholyte.

Redox flow batteries (RFB) are secondary (rechargeable) fuel cells and battery-fuel cell hybrids (FIG. 1). Unlike traditional batteries, RFBs decouple system energy and power, and so like a fuel cell have a total system energy that scales with the size of electroactive material storage tanks and a system power that scales with the size of the electrochemical reactor. This trait makes them ideal for storing large amounts of electricity at low cost, since additional electroactive material is usually far less expensive than a larger reactor. For this reason, RFBs are currently used and being further developed as massive, grid-level electricity storage devices (J. Power Sources 2006, 160, 716-732). This is especially valuable for intermittent renewable energy sources, which, in order to stabilize their output to current electrical grids, require a source of backup electricity when the given resource (wind, solar) becomes temporarily unavailable.

Many RFB chemistries have been developed, yet they universally use oxidants that undergo 1 or 2 $e^-$ reductions (n=1 or 2) and/or have low to moderate solubility ($C_{max}$), greatly limiting (1) their volumetric energy densities and (2) their power densities. This applies to $VO_2^+$, $Ce^{4+}$, $Fe^{3+}$ (1 $e^-$), $Br_2$ (2 $e^-$), and $O_2$ (4 $e^-$), the oxidants in all-vanadium, $Zn/Ce^{4+}$, $Cr^{2+}/Fe^{3+}$, $H_2/Br_2$, and $H_2/O_2$ RFBs, respectively. While $O_2$ and $Br_2$ have high n, their values for $C_{max}$ are much smaller than those for the other species (0.001 and 0.2 M vs.>1 M). The lower energy and power densities associated with RFBs result in very large battery sizes relative to competing technologies, such as lead-acid and Li-ion batteries. The sheer size of such batteries contributes to unwanted facilities, operational, and materials costs, as well as restrictions on battery siting.

Thus there exists a need for oxidants of significantly higher energy and power density. While multiple other oxidants have higher n and $C_{max}$, such as permanganate ($MnO_4^-$, n=5, $C_{max}$=7.3 M), multi-$e^-$ reactions by their very nature tend to be irreversible and therefore unsuitable for RFBs. Many such reactions follow intricate mechanisms and result in precipitation or poisoning at the cathode, decreasing current and power output quickly over time. A reversible oxidant system with high n and $C_{max}$ and a non-fouling reaction is unknown in the field.

The oxidant $Cr_2O_7^{2-}$ is attractive for use in RFBs since its energy density parameters (n=6, $C_{max}$=7.1) are similar to those of $MnO_4^-$. Additionally, $Cr_2O_7^{2-}$'s diffusion coefficient is significantly higher than that for $VO_2^+$ or $Ce^{4+}$ (0.96 vs. 0.25 and 0.36×$10^{-5}$ $cm^2/s$), resulting in faster $Cr_2O_7^{2-}$ transport and correspondingly higher power density. These impressive traits of high energy and power densities led researchers to develop primary (non-rechargeable) $Zn/Cr_2O_7^{2-}$ cells from 1841 to 1859, after which they became a standard power source for telegraphs.

RFBs based on the reduction of $Cr_2O_7^{2-}$ to $Cr^{3+}$ have for example been proposed in FR7917793, but such systems are in fact far too inefficient for practical use. These RFBs regenerate $Cr_2O_7^{2-}$ by oxidizing $Cr^{3+}$ at multiple solid-state electrode catalysts, all of which oxidize $Cr^{3+}$ at such high overpotentials that they result in $O_2$ coevolution. Such catalysts include Pt-group metals, poor metal oxides (e.g. $PbO_2$), and conductive carbon materials. The high overpotential for $Cr^{3+}$ oxidation causes both significant loss of voltage to heat and significant loss of current to $O_2$ evolution instead of $Cr_2O_7^{2-}$ regeneration, resulting in a system with low to negative recharge efficiency. For this reason, the use of these solid-state catalysts to oxidize $Cr^{3+}$ is exclusively confined to energy-consuming (rather than energy-storing) industrial use to regenerate $Cr_2O_7^{2-}$ in spent chromium plating solutions. Indeed, the previously proposed RFBs using $Cr_2O_7^{2-}$ are so ineffective that they are either not discussed in modern reviews of RFBs or are discussed only in the context of their poor functionality. An energy-efficient method to regenerate $Cr_2O_7^{2-}$ has not been devised in the 175 years since $Zn/Cr_2O_7^{2-}$ primary cells were first invented, despite significant efforts over the past 67 years. The impossibility of energy-efficient 6 e oxidation of 2 $Cr^{3+}$ to $Cr_2O_7^{2-}$ is currently so widely accepted that modern flow battery researchers have devised low-solubility Cr complexes that undergo sequential 1 $e^-$ oxidations, resulting in significant compromise of both the energy density and voltage available from $Cr_2O_7^{2-}$.

The present invention takes a known high energy, high power, irreversibly reduced (discharged) oxidant, $Cr_2O_7^{2-}$, and allows for its reversible use in RFBs. $Cr_2O_7^{2-}$'s reduction product, $Cr^{3+}$, cannot be readily oxidized (i.e. recharged) heterogeneously at known electrode catalysts. Thus previous batteries using $Cr_2O_7^{2-}$ served only as primary (non-rechargeable) cells. In the present invention, $Cr_2O_7^{2-}$'s irreversible reaction is overcome by employing an electrochemically reversible electron mediator that is heterogeneously oxidized by the cathode (during recharge) and that homogeneously oxidizes $Cr^{3+}$ back to $Cr_2O_7^{2-}$, completing the recharge cycle using an $EC_{cat}$ mechanism.

Electron mediators have been described in the prior art, for example in WO 2013/131838, which uses the 1 $e^-$ mediator $Ce^{4+}$ to shuttle $e^-$ back and forth between a catalytic bed (cf. Summary, and paras. [0008], [0009]). However, the solution presented in WO 2013/131838 specifically requires a catalyst in addition to $Ce^{4+}$ in order to perform a 4 $e^-$ oxidation of $H_2O$ or an oxidation of other compounds.

Furthermore, it is demonstrated herein that $Cr_2O_7^{2-}$ may be steadily reduced (discharged) for extended periods of time without any undesirable side reactions. In contrast, the reduction of $MnO_4^-$, an oxidant with a similar energy and power density, results in rapid precipitation of $MnO_2$, resulting, amongst other things, in electrode fouling.

SUMMARY OF THE INVENTION

In a first aspect, the present invention provides a rechargeable redox flow battery (RFB) comprising an electrochemical cell comprising at least one positive electrode in a positive half-cell and a negative electrode in a negative half-cell, an ion-conducting membrane between the two half-cells, wherein the membrane is designed for dual acidic anolyte and catholyte or designed for an acidic catholyte and an alkaline anolyte; at least two storage tanks for catholyte and anolyte, one or more pumps to circulate stored catholyte and anolyte through the cathodic and anodic half cells, respectively, and at least one anolyte and at least one catholyte;

wherein the anolyte comprises at least one fuel capable of reversible oxidation, at least one electrolyte for conductivity and at least one solvent; and the catholyte comprises the $Cr^{III}/Cr^{VI}$ redox couple, at least one electrolyte for conductivity, at least one solvent and at least one electrochemically reversible electron mediator; and further wherein said electron mediator is capable of homogeneously oxidizing $Cr^{III}$ to $Cr^{VI}$ using an $EC_{cat}$ mechanism in solution.

In another aspect, the present invention also relates to the use of the redox flow battery as described herein to store electrical energy for grid-level energy storage, homeowner energy storage, remote locations, firming or load leveling of intermittent renewable electricity generation site, preferably wind and solar farms, micro-hydropower, geothermal energy, tidal power, energy arbitrage, portable and/or personal electronics, electric vehicles such as ships, submarines, planes, unmanned underwater vehicles (UUVs) or unmanned aerial vehicles (UAVs), military electronics equipment, satellites and other manned or unmanned spacecraft, or other applications where rechargeable RFBs can be beneficially employed.

A further aspect of the present invention is a method for storing electrical energy comprising:
a) circulating an electrolyte through a positive half-cell in the redox flow battery as described herein,
b) supplying a current power source to the positive electrode of said redox flow battery,
c) using an electrochemically reversible electron mediator that is heterogeneously oxidized by the cathode to homogeneously oxidize $Cr^{III}$ to $Cr^{VI}$ without concurrently oxidizing water.

DETAILED DESCRIPTION

An "$EC_{cat}$ mechanism" (also denoted as $EC^I$ in Bard and Faulkner in "Electrochemical Methods: Fundamentals and Applications", $2^{nd}$ Ed. 2001) is described in the following general manner: it consists of an electrochemical step (hereafter E) in which a given species A is converted to species B. This is followed by a subsequent chemical-catalytic step (hereafter $C_{cat}$) between B and species C, which regenerates species A from B and produces by-product D from C. The regeneration of A represents a catalytic process that gives an apparent increase in concentration of A near the electrode surface, generating higher than expected electrochemical current for the reduction of A to B:

$$E: A + 1e^- \rightarrow B$$

$$C_{cat}: B + C \rightarrow A + D$$

Since regenerated A must remain at the electrode surface to be detected, high currents are detected at (1) shorter time periods between consumption and regeneration of A and (2) decreased flow rates of solution across the electrode, which decrease the time for transport and the rate of transport for A leaving the electrode surface.

The observed "electrochemical potential," or simply "potential," E, of a given soluble redox species (e.g., $Ce^{4+}$) participating in a simplistic, reversible reduction (e.g. $Ce^{4+} + 1\ e^- \leftrightarrows Ce^{3+}$) is defined by the Nernst equation:

$$E = E^0 + \frac{RT}{nF} \ln \frac{C_{ox}}{C_{red}}$$

where $C_{ox}$ and $C_{red}$ are the respective concentrations of the oxidized and reduced forms of the given redox species (e.g. $Ce^{4+}$ and $Ce^{3+}$), n is the number of $e^-$ involved in the conversion of the oxidized to the reduced form of the given redox species, R is the universal gas constant, T is the temperature, and F is Faradays constant. The term $E^0$ is the standard potential of the redox species, which is the observed potential (E) when $C_{ox}=C_{red}$. In the context of the invention, the Nernst equation implies that the potential of a given reversible redox species varies from its $E^0$ depending on the ratio of the oxidized to reduced form present in solution. Thus a ratio of $Ce^{4+}$ to $Ce^{3+}$ of 99 to 1 shifts the E of $Ce^{4+}$ positive by 0.120 V, and a ratio of 99.96 to 0.04 shifts E positive by 0.200 V.

A "rotating disk electrode," RDE, is used in RDE voltammetry to achieve laminar flow across an electrode surface. When planar RDEs are used, as in the results presented herein, RDE voltammetry allows direct assessment of a multitude of fundamental parameters of a given fuel or oxidant for use in RFBs. Because RDE voltammetry assesses fundamental parameters, rather than a given fuel cell's or RFB's performance, RDE voltammetric results are universally comparable across all possible systems.

The "mass transport limited current," $i_L$, of an electrochemical reaction in RDE voltammetry is the maximum obtainable current at a given RDE rotation rate. Since the $i_L$ is a function of the steady-state transport that originates from laminar flow across the RDE, the $i_L$ is independent of potential, and appears as a horizontal line in an RDE voltammogram.

The half-wave potential, $E_{1/2}$, of a given electrochemical reaction in RDE voltammetry is the potential at which ½ of the $i_L$ is achieved. A reasonably accurate measurement of $E_{1/2}$ must be performed at fairly low current density; at high current density in analytical glassware, solution resistance distorts the RDE voltammogram with a diagonal line that significantly shifts the $E_{1/2}$. To achieve low current density for a high n oxidant like $Cr_2O_7^{2-}$, low concentration (1 to 10 mM) and low to moderate rotation rate (50 to 3000 rpm) must be used. In the context of the invention, the $E_{1/2}$ is useful as a first-order assessment of the operating potential of a given electrode, and thus the operating voltage of a RFB.

The terms "NHE" and "Ag/AgCl" refer to two standard types of reference electrodes used to measure the E of an electrode, where NHE is the Normal Hydrogen Electrode and Ag/AgCl is the silver/silver chloride electrode, and a given $E_{Ag/AgCl} = E_{NHE} - 0.197$ V. Unless stated otherwise, all unreferenced potentials in this section are shown as V vs. Ag/AgCl, not V vs. NHE.

The term storage tank refers to vessels wherein one or more liquids and/or gases can be stored. The liquids and/or gases may be separated from each other by a baffle or other suitable partition walls.

"Alkyl" refers to a straight or branched hydrocarbon chain radical consisting solely of carbon and hydrogen atoms, containing no unsaturation, having from one to ten carbon atoms (e.g., (C1-10) alkyl or C1-10 alkyl). Whenever it appears herein, a numerical range such as "1 to 10" refers to each integer in the given range—e.g., "1 to 10 carbon atoms" means that the alkyl group may consist of 1 carbon atom, 2 carbon atoms, 3 carbon atoms, etc., up to and including 10 carbon atoms, although the definition is also intended to cover the occurrence of the term "alkyl" where no numerical range is specifically designated. Typical alkyl groups include, but are in no way limited to, methyl, ethyl, propyl, isopropyl, n-butyl, iso-butyl, sec-butyl isobutyl, tertiary butyl, pentyl, isopentyl, neopentyl, hexyl, septyl, octyl, nonyl and decyl. The alkyl moiety may be attached to the rest of the molecule by a single bond, such as for example, methyl (Me), ethyl (Et), n-propyl (Pr), 1-methylethyl (isopropyl), n-butyl, n-pentyl, 1,1-dimethylethyl (t-butyl) and 3-methylhexyl. Unless stated otherwise specifically in the specification, an alkyl group is optionally substituted by one or more substituents which are independently alkyl, aryl, heteroaryl, hydroxy, halo, cyano, trifluoromethyl, trifluoromethoxy, nitro, trimethylsilanyl, —$OR^a$, —$SR^a$, —OC(O)—$R^a$, —$N(R^a)2$, —C(O)$R^a$, —C(O)O$R^a$, —OC(O)N($R^a$)$_2$, —C(O)N($R^a$)$_2$, —N($R^a$)C(O)O$R^a$, —N($R^a$)C(O)$R^a$, —N($R^a$)C(O)N($R^a$)$_2$, N($R^a$)C(N$R^a$)N($R^a$)$_2$, —N($R^a$)S(O)$_t$$R^a$ (where t is 1 or 2), —S(O)$_t$O$R^a$ (where t is 1 or 2), —S(O)$_t$N($R^a$)$_2$ (where t is 1 or 2), or PO$_3$($R^a$)$_2$ where each $R^a$ is independently hydrogen, alkyl, fluoroalkyl, aryl, or heteroaryl.

The term "alkoxy" refers to the group —O-alkyl, including from 1 to 8 carbon atoms of a straight, branched, cyclic configuration and combinations thereof (e.g. as outlined above for alkyl) attached to the parent structure through an oxygen. Examples include, but are not limited to, methoxy, ethoxy, propoxy, isopropoxy, cyclopropyloxy and cyclohexyloxy. "Lower alkoxy" refers to alkoxy groups containing one to six carbons.

The term "substituted alkoxy" refers to alkoxy wherein the alkyl constituent is substituted (i.e., —O-(substituted alkyl)). Unless stated otherwise specifically in the specification, the alkyl moiety of an alkoxy group is optionally substituted by one or more substituents which independently are: alkyl, heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —$OR^a$, —$SR^a$, —OC(O)—$R^a$, —$N(R^a)2$, —C(O)$R^a$, —C(O)O$R^a$, —OC(O)N($R^a$)$_2$, —C(O)N($R^a$)$_2$, —N($R^a$)C(O)O$R^a$, —N($R^a$)C(O)$R^a$, —N($R^a$)C(O)N($R^a$)$_2$, N($R^a$)C(N$R^a$)N($R^a$)$_2$, —N($R^a$)S(O)$_t$$R^a$ (where t is 1 or 2), —S(O)$_t$O$R^a$ (where t is 1 or 2), —S(O)$_t$N($R^a$)$_2$ (where t is 1 or 2), or PO$_3$($R^a$)$_2$ where each $R^a$ is independently hydrogen, fluoro, alkyl, fluoroalkyl, aryl, or heteroaryl.

The term "alkoxycarbonyl" refers to a group of the formula (alkoxy)(C=O)— attached through the carbonyl carbon wherein the alkoxy group has the indicated number of carbon atoms. Thus a (C$_{1-6}$) alkoxycarbonyl group is an alkoxy group having from 1 to 6 carbon atoms attached through its oxygen to a carbonyl linker. "Lower alkoxycarbonyl" refers to an alkoxycarbonyl group wherein the alkoxy group is a lower alkoxy group.

The term "carboxy" refers to a —(C=O)OH radical.

The term "aromatic" or "aryl" or "Ar" refers to an aromatic radical with six to ten ring atoms (e.g., C6-C10 aromatic or C6-C10 aryl) which has at least one ring having a conjugated pi electron system which is carbocyclic (e.g., phenyl, fluorenyl, and naphthyl). Bivalent radicals formed from substituted benzene derivatives and having the free valences at ring atoms are named as substituted phenylene radicals. Bivalent radicals derived from univalent polycyclic hydrocarbon radicals whose names end in "-yl" by removal of one hydrogen atom from the carbon atom with the free valence are named by adding "-idene" to the name of the corresponding univalent radical, e.g., a naphthyl group with two points of attachment is termed naphthylidene. Whenever it appears herein, a numerical range such as "6 to 10" refers to each integer in the given range; e.g., "6 to 10 ring atoms" means that the aryl group may consist of 6 ring atoms, 7 ring atoms, etc., up to and including 10 ring atoms. The term includes monocyclic or fused-ring polycyclic (i.e., rings which share adjacent pairs of ring atoms) groups. Unless stated otherwise specifically in the specification, an aryl moiety is optionally substituted by one or more substituents which are independently fluoro, alkyl, heteroalkyl, aryl, heteroaryl, hydroxy, halo, cyano, trifluoromethyl, trifluoromethoxy, —$OR^a$, —$SR^a$, —OC(O)—$R^a$, —$N(R^a)2$, —C(O)$R^a$, —C(O)O$R^a$, —OC(O)N($R^a$)$_2$, —C(O)N($R^a$)$_2$, —N($R^a$)C(O)O$R^a$, —N($R^a$)C(O)$R^a$, —N($R^a$)C(O)N($R^a$)$_2$, N($R^a$)C(N$R^a$)N($R^a$)$_2$, —N($R^a$)S(O)$_t$$R^a$ (where t is 1 or 2), —S(O)$_t$O$R^a$ (where t is 1 or 2), —S(O)$_t$N($R^a$)$_2$ (where t is 1 or 2), or $PO_3(R^a)_2$ where each $R^a$ is independently fluoro, hydrogen, alkyl, fluoroalkyl, aryl, or heteroaryl.

The term "fluoroalkyl" refers to an alkyl radical, as defined above, that is substituted by one or more fluoro radicals, as defined above, for example, trifluoromethyl, difluoromethyl, 2,2,2-trifluoroethyl, 1-fluoromethyl-2-fluoroethyl, and the like. The alkyl part of the fluoroalkyl radical may be optionally substituted as defined above for an alkyl group.

The term "fluoroalkoxy" refers to an alkoxy radical, as defined above, that is substituted by one or more fluoro radicals, as defined above, for example, trifluoromethyoxy, difluoromethoxy, 2,2,2-trifluoroethoxy, 1-fluoromethyl-2-fluoroethoxy, and the like. The alkyl part of the fluoroalkoxy radical may be optionally substituted as defined above for an alkyl group.

The term "fluoroaryl" refers to an aryl or heteroaryl radical, as defined above, that is substituted by one or more fluoro radicals, as defined above, for example, pentafluorobenzene, trifluorobenzene, difluorobenzene, trifluoro-1,10-phenanthroline, pentafluoro-2,2'-bipyridine, and the like.

The term "heteroalkyl" include optionally substituted alkyl radicals and which have one or more skeletal chain atoms selected from an atom other than carbon, e.g., oxygen, nitrogen, sulfur, phosphorus or combinations thereof. A numerical range may be given—e.g., $C_1$-$C_4$ heteroalkyl which refers to the chain length in total, which in this example is 4 atoms long. A heteroalkyl group may be substituted with one or more substituents which independently are: alkyl, heteroalkyl, aryl, heteroaryl, hydroxy, halo, cyano, nitro, oxo, thioxo, trimethylsilanyl, —$OR^a$, —$SR^a$, —OC(O)—$R^a$, —$N(R^a)2$, —$C(O)R^a$, —$C(O)OR^a$, —OC(O)N($R^a$)$_2$, —C(O)N($R^a$)$_2$, —N($R^a$)C(O)O$R^a$, —N($R^a$)C(O)$R^a$, —N($R^a$)C(O)N($R^a$)$_2$, N($R^a$)C(N$R^a$)N($R^a$)$_2$, —N($R^a$)S(O)$_t$$R^a$ (where t is 1 or 2), —S(O)$_t$O$R^a$ (where t is 1 or 2), —S(O)$_t$N($R^a$)$_2$ (where t is 1 or 2), or $PO_3(R^a)_2$ where each $R^a$ is independently fluoro, hydrogen, alkyl, fluoroalkyl, aryl, or heteroaryl.

"Heteroaryl" or "heteroaromatic" or "HetAr" refers to a 5- to 18-membered aromatic radical (e.g., C5-C13 heteroaryl) that includes one or more ring heteroatoms selected from nitrogen, oxygen and sulfur, and which may be a monocyclic, bicyclic, tricyclic or tetracyclic ring system. Whenever it appears herein, a numerical range such as "5 to 18" refers to each integer in the given range—e.g., "5 to 18" ring atoms" means that the heteroaryl group may consist of 5 ring atoms, 6 ring atoms, etc., up to and including 18 ring atoms. Bivalent radicals derived from univalent heteroaryl radicals whose names end in "-yl" by removal of one hydrogen atom from the atom with the free valence are named by adding "-idene" to the name of the corresponding univalent radical—e.g., a pyridyl group with two points of attachment is a pyridylidene. A N-containing "heteroaromatic" or "heteroaryl" moiety refers to an aromatic group in which at least one of the skeletal atoms of the ring is a nitrogen atom. The polycyclic heteroaryl group may be fused or non-fused. The heteroatom(s) in the heteroaryl radical are optionally oxidized. One or more nitrogen atoms, if present, are optionally quaternized. The heteroaryl may be attached to the rest of the molecule through any atom of the ring(s). Unless stated otherwise specifically in the specification, a heteroaryl moiety is optionally substituted by one or more substituents which are independently: alkyl, heteroalkyl, aryl, heteroaryl, hydroxy, halo, cyano, nitro, oxo, thioxo, trimethylsilanyl, —$OR^a$, —$SR^a$, —OC(O)—$R^a$, —$N(R^a)2$, —$C(O)R^a$, —$C(O)OR^a$, —OC(O)N($R^a$)$_2$, —C(O)N($R^a$)$_2$, —N($R^a$)C(O)O$R^a$, —N($R^a$)C(O)$R^a$, —N($R^a$)C(O)N($R^a$)$_2$, N($R^a$)C(N$R^a$)N($R^a$)$_2$, —N($R^a$)S(O)$_t$$R^a$ (where t is 1 or 2), —S(O)$_t$O$R^a$ (where t is 1 or 2), —S(O)$_t$N($R^a$)$_2$ (where t is 1 or 2), or $PO_3(R^a)_2$ where each $R^a$ is independently fluoro, hydrogen, alkyl, fluoroalkyl, aryl, or heteroaryl.

Figure 2:
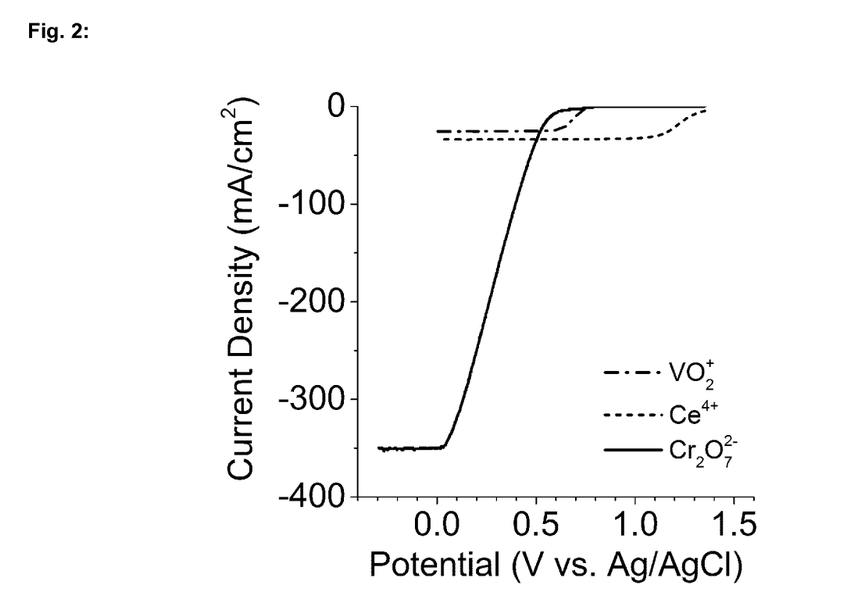
FIG. 2: RDE voltammetry of 100 mM $VO_2^+$ (dash-dot), $Ce^{4+}$ (dashed), and $Cr_2O_7^{2-}$ (solid), at Au in 0.5 M $H_2SO_4$ at 1000 rpm, 50 mV/s.
Figure 3:
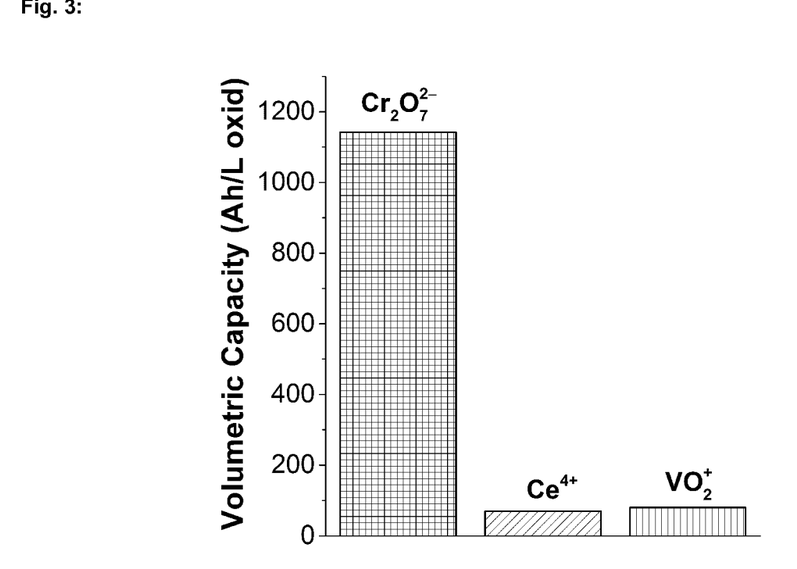
FIG. 3: Volumetric capacity of saturated solutions of $Cr_2O_7^{2-}$ (7.1 M), $Ce^{4+}$ (2.5 M), and $VO_2^+$ (3 M).
Figure 4:
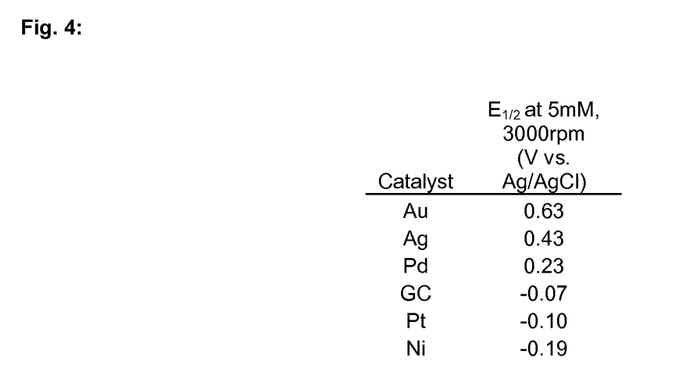
FIG. 4: Table of half-wave potentials ($E_{1/2}$) of various $Cr_2O_7^{2-}$ catalysts, taken from RDE voltammetry of 5 mM $Cr_2O_7^{2-}$ in 0.5 M $H_2SO_4$ at 3000 rpm, 50 mV/s.

The superior energy density parameters of $Cr_2O_7^{2-}$ make it an ideal oxidant for use in high-energy, high-power RFBs. The current density of $Cr_2O_7^{2-}$ is 14- and 10-fold greater than that of $VO_2^+$ or $Ce^{4+}$, respectively, for equimolar solutions (cf. FIG. 2), while $Cr_2O_7^{2-}$ has 14- and 17-fold greater volumetric capacity than $VO_2^+$ or $Ce^{4+}$ when comparing saturated solutions (cf. FIG. 3). While the sodium salt of $Cr_2O_7^{2-}$, $Na_2Cr_2O_7$, has higher solubility than either of these two oxidants (7.1 vs. 3.0 and 2.5 M, respectively), most of the improvement in volumetric capacity is due to $Cr_2O_7^{2-}$'s 6 $e^-$ reduction, which is irreversible at all cathode catalysts studied by the inventor (glassy carbon, Au, Ag, Pt, Pd, Ni, FIG. 4) and studied in the prior art such as DE914264, or FR7917793 (Pt-group metals (see also Ahmed et al., "Electrochemical chromic acid regeneration process with fuel-cell electrode assistance. Part I: Removal of contaminants." J. Appl. Electrochem. 2001, 31 (12), 1381-1387), poor metal oxides, and other carbon materials):

$$Cr_2O_7^{2-}+6e^-+14H^+\rightarrow 2Cr^{3+}+7H_2O$$

In aqueous solutions, $Cr_2O_7^{2-}$ exists in equilibrium with chromate, $CrO_4^{2-}$, which can undergo a 3 $e^-$ reduction and forms a sodium salt, $Na_2CrO_4$, with lower solubility (5.4 M). While $CrO_4^{2-}$ has lower energy and power density than $Cr_2O_7^{2-}$, strongly acidic solutions and higher overall [Cr] greatly favor $Cr_2O_7^{2-}$ speciation. Thus conditions of high oxidant and electrolyte concentration, which are ideal for RFBs, also favor the predominance of $Cr_2O_7^{2-}$:

$$CrO_4^{2-}+3e^-+8H^+\rightarrow Cr^{3+}+4H_2O$$

$$2CrO_4^{2-}+2H^+\rightleftharpoons Cr_2O_7^{2-}+H_2O$$

While $Cr_2O_7^{2-}$ represents a path toward RFBs with order-of-magnitude improvements in energy and power densities, the key to its successful implementation is devising a method to regenerate $Cr_2O_7^{2-}$ from $Cr^{3+}$ during RFB recharge. This invention proposes to accomplish this homogeneously via an electron mediator (EM), which undergoes electrochemically reversible oxidation via heterogeneous reaction at a cathode. The resulting series of reactions would follow an $EC_{cat}$ mechanism, where EM is continually regenerated during its oxidation until $Cr^{3+}$ is fully recharged to $Cr_2O_7^{2-}$:

$E$: $EM\rightarrow EM^++1e^-$ $C_{cat}$: $2Cr^{3+}+6EM^++7H_2O\rightarrow Cr_2O_7^{2-}+6EM+14H^+$ Using a 6 $e^-$ discharge and a 1 $e^-$ recharge should result in asymmetric charging properties for $Cr_2O_7^{2-}$. However, the expected recharge current will nonetheless be significantly higher than for the 1 $e^-$ EM by itself, since the $EC_{cat}$ mechanism will rapidly replenish EM at the electrode surface at lower catholyte flow rates.

Thus, one aspect of the present invention is a rechargeable redox flow battery comprising an electrochemical cell comprising at least one positive electrode in a positive half-cell and a negative electrode in a negative half-cell, an ion-conducting membrane between the two half-cells, wherein the membrane is designed for dual acidic anolyte and catholyte or designed for an acidic cathodic solution and an alkaline anodic solution; one or more storage tanks, for catholyte and anolyte, one or more pumps to circulate stored catholyte and anolyte through the cathodic and anodic half cells, respectively and at least one anolyte and at least one catholyte. The anolyte comprises at least one fuel capable of reversible oxidation, at least one electrolyte for conductivity and at least one solvent. The catholyte comprises the $Cr^{III}/Cr^{VI}$ redox couple, at least one electrolyte for conductivity, at least one solvent and at least one electrochemically reversible electron mediator. Said electron mediator is capable of homogeneously oxidizing $Cr^{III}$ to $Cr^{VI}$ using an $EC_{cat}$ mechanism in solution.

In one embodiment, the electron mediator of the redox flow battery as described herein has a standard electrode potential ($E^0$) from +0.980 to +1.800 V. Preferably, the standard electrode potential ($E^0$) of the electron mediator is from +1.100 to +1.400V, or from +1.200 to 1.350V.

In some embodiments, the electron mediator of the redox flow battery as described herein, is selected from the group consisting of $Ce^{4+}/Ce^{3+}$;

$Ru(bipy)_3^{3+}/Ru(bipy)_3^{2+}$, wherein bipy is 2,2'-dipyridine and/or 2,2'-dipyridine substituted with one or more substituents chosen from the group consisting of fluoro, chloro, bromo, hydroxy, nitro, fluoroalkyl, fluoroalkoxy, fluoroaryl, cyano, alkoxy, carboxy, —OC(=O)R⁰, —SO₃²⁻, —SO₂X. or —C(=O)—X, wherein X is hydrogen, $C_1$-$C_6$ alkyl, —OR¹, fluoroalkyl or —NR²R³, wherein R⁰, R¹, R², and R³ are each independently hydrogen, $C_1$-$C_6$ alkyl, $C_5$-$C_7$ cycloalkyl, perfluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy or cyano, wherein the optionally substituted 2,2'-dipyridine has a more positive reduction potential than $E^0$=+1.24 V vs. NHE, preferably 2,2'-dipyridine is substituted with one or more fluoro, chloro, bromo, hydroxy, nitro, fluoroalkyl, fluoroalkoxy, fluoroaryl, cyano, alkoxy, carboxy substituents, more preferably 2,2'-dipyridine is substituted with one or more fluoro, fluoroalkyl, fluoroalkoxy and/or fluoroaryl substituents, most preferably 2,2'-dipyridine is substituted with 8 fluoro substituents;

$Ru(phen)_3^{3+}/Ru(phen)_3^{2+}$, wherein phen is 1,10-phenanthroline and/or 1,10-phenanthroline substituted with one or more substituents chosen from the group consisting of fluoro, chloro, bromo, hydroxy, nitro, fluoroalkyl, fluoroalkoxy, fluoroaryl, cyano, alkoxy, carboxy, —OC(=O)R⁰, —SO₃²⁻, —SO₂X. or —C(=O)—X, wherein X is hydrogen, $C_1$-$C_6$ alkyl, —OR¹, fluoroalkyl or —NR²R³, wherein R⁰, R¹, R², and R³ are each independently hydrogen, $C_1$-$C_6$ alkyl, $C_5$-$C_7$ cycloalkyl, perfluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy or cyano, wherein the optionally substituted 1,10-phenanthroline has a more positive reduction potential than $E^0$=+1.20 V vs. NHE, preferably 1,10-phenanthroline is substituted with one or more fluoro, chloro, bromo, hydroxy, nitro, fluoroalkyl, fluoroalkoxy, fluoroaryl, cyano, alkoxy, carboxy substituents, more preferably 1,10-phenanthroline is substituted with one or more fluoro, fluoroalkyl, fluoroalkoxy and/or fluoroaryl substituents, most preferably 1,10-phenanthroline is substituted with 8 fluoro substituents;

$Fe(phen)_3^{3+}/Fe(phen)_3^{2+}$; wherein phen is 1,10-phenanthroline and/or 1,10-phenanthroline substituted with one or more substituents chosen from the group consisting of fluoro, chloro, bromo, hydroxy, nitro, fluoroalkyl, fluoroalkoxy, fluoroaryl, cyano, alkoxy, carboxy, —OC(=O)R⁰, —SO₃²⁻, —SO₂X. or —C(=O)—X, wherein X is hydrogen, $C_1$-$C_6$ alkyl, —OR¹, fluoroalkyl or —NR²R³, wherein R⁰, R¹, R², and R³ are each independently hydrogen, $C_1$-$C_6$ alkyl, $C_5$-$C_7$ cycloalkyl, perfluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy or cyano, wherein the optionally substituted 1,10-phenanthroline has a more positive reduction potential than $E^0$=+1.15 V vs. NHE, preferably 1,10-phenanthroline is substituted with one or more fluoro, chloro, bromo, hydroxy, nitro, fluoroalkyl, fluoroalkoxy, fluoroaryl, cyano, alkoxy, carboxy substituents, more preferably 1,10-phenanthroline is substituted with one or more fluoro, fluoroalkyl, fluoroalkoxy and/or fluoroaryl substituents, most preferably 1,10-phenanthroline is substituted with 8 fluoro substituents;

$Fe(bipy)_3^{3+}/Fe(bipy)_3^{2+}$; wherein bipy is 2,2'-dipyridine and/or 2,2'-dipyridine substituted with one or more substituents chosen from the group consisting of fluoro, chloro, bromo, hydroxy, nitro, fluoroalkyl, fluoroalkoxy, fluoroaryl, cyano, alkoxy, carboxy, —OC(=O)R⁰, —SO₃²⁻, —SO₂X. or —C(=O)—X, wherein X is hydrogen, $C_1$-$C_6$ alkyl, —OR¹, fluoroalkyl or —NR²R³, wherein R⁰, R¹, R², and R³ are each independently hydrogen, $C_1$-$C_6$ alkyl, $C_5$-$C_7$ cycloalkyl, perfluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy or cyano, wherein the optionally substituted 2,2'-dipyridine has a more positive reduction potential than $E^0$=+1.03 V vs. NHE, preferably 2,2'-dipyridine is substituted with one or more fluoro, chloro, bromo, hydroxy, nitro, fluoroalkyl, fluoroalkoxy, fluoroaryl, cyano, alkoxy, carboxy substituents, more preferably 2,2'-dipyridine is substituted with one or more fluoro, fluoroalkyl, fluoroalkoxy and/or fluoroaryl substituents, most preferably 2,2'-dipyridine is substituted with 8 fluoro substituents;

$Fe(PR_3)_5^{3+}/Fe(PR_3)_5^{2+}$, wherein R is chosen from the group consisting of fluoro, chloro, bromo, hydroxy, nitro, fluoroalkyl, fluoroalkoxy, fluoroaryl, cyano, alkoxy, carboxy, —OC(=O)R⁰, —SO₃²⁻, —SO₂X. or —C(=O)—X, wherein X is hydrogen, $C_1$-$C_6$ alkyl, —OR¹, fluoroalkyl or —NR²R³, wherein R⁰, R¹, R², and R³ are each independently hydrogen, $C_1$-$C_6$ alkyl, $C_5$-$C_7$ cycloalkyl, fluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy, cyano, preferably R is pentafluorobenzene;

$Fe(CO)_x(PR)_{5-x}^{3+}/Fe(CO)_x(PR)_{5-x}^{2+}$, wherein x is 1 to 4 and wherein R is chosen from the group consisting of fluoro, chloro, bromo, hydroxy, nitro, fluoroalkyl, fluoroalkoxy, fluoroaryl, cyano, alkoxy, carboxy, —OC(=O)R⁰, —SO₃²⁻, —SO₂X. or —C(=O)—X, wherein X is hydrogen, $C_1$-$C_6$ alkyl, —OR¹, fluoroalkyl or —NR²R³, wherein R⁰, R¹, R², and R³ are each independently hydrogen, $C_1$-$C_6$ alkyl, $C_5$-$C_7$ cycloalkyl, fluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy, cyano, preferably R is pentafluorobenzene;

$Fe(CO)_x^{3+}/Fe(CO)_x^{2+}$, wherein x is 1 to 4;

$Cr(\eta^6-C_6R_xH_{6-x})_2$, wherein R is sulfonate (—SO₃⁻) and x is 0 to 6;

$Cr(CO)_4(P(OC_6R_xH_{5-x})_3)_2$, wherein R is sulfonate (—SO₃⁻) and x=0 to 5; $Cr(CO)_4(P(OCH_2R)_3)_2$, wherein R is sulfonate (—SO₃⁻) or hydroxyl (—OH) and mixtures thereof.

In a certain embodiment, the catholyte of the redox flow battery as described herein is a liquid comprising at least one electrochemically reversible electron mediator, an electrolyte for conductivity and pH control, including a strong acid with a $pK_a$ of 2 or less, preferably $HNO_3$, $H_2SO_4$, $HClO_4$, $H_3PO_4$, or mixtures thereof, or simply an electrolyte for conductivity, preferably $MClO_4$, $MNO_3$, $M_2SO_4$, MF, MCl, MBr, or MI, where M=Li, Na, or K, tetra-n-butylammonium X, where X=F, Cl, Br, I, or hexafluorophosphate; and a solvent, selected from the group consisting of water or a nonaqueous solvent, such as acetonitrile, dimethylsulfoxide, dimethylformamide, methanol, ethanol, 1-propanol, isopropanol, ether, diglyme, tetrahydrofuran, glycerol, and mixtures thereof.

In one embodiment, the anolyte of the redox flow battery as described herein is a liquid comprising a solution of a fuel capable of reversible oxidation; an electrolyte for conductivity and pH control, including a strong acid with a $pK_a$ of 2 or less, preferably $HNO_3$, $H_2SO_4$, $HClO_4$, $H_3PO_4$, or mixtures thereof, or simply an electrolyte for conductivity, preferably $MClO_4$, $MNO_3$, $M_2SO_4$, MF, MCl, MBr, or MI, where M=Li, Na, or K, tetra-n-butylammonium X, where X=F, Cl, Br, I, or hexafluorophosphate; and a solvent selected from the group consisting of water or a nonaqueous solvent, such as acetonitrile, dimethylsulfoxide, dimethylformamide, methanol, ethanol, 1-propanol, isopropanol, ether, diglyme, tetrahydrofuran, glycerol, and mixtures thereof.

In another embodiment, the reversible fuel of the redox flow battery as described herein is a liquid comprising a redox couple selected from the group consisting of (1) $Zn^{II}/Zn$; (2) $Fe^{III}/Fe^{II}/Fe$; (3) $Cu^{II}/Cu^{I}/Cu$; (4) $H^+/H_2$; (5) $V^{III}/V^{II}$; (6) $Cr^{III}/Cr^{II}/Cr$; (7) $Cr^{III}/Cr^{II}$; (8) $Al^{III}/Al$; (9) $Zr^{IV}/Zr$; (10) $Co^{II}/Co$; (11) $Ni^{II}/Ni$; (12) $Cd^{II}/Cd$; (13) $In^{III}/In^{II}/In^{I}/In$; (14) $Ga^{III}/Ga^{I}/Ga$; (15) $Sn^{II}/Sn$; (16) $Sn^{IV}/Sn^{II}$; (17) $Sb^{III}/Sb$; (18) $Pb^{II}/Pb$; (19) $Li^{I}/Li$; (20) $Na^{I}/Na$; and/or the oxidized and reduced conjugates of (21) anthraquinone 2,6-disulfonate and mixtures thereof. Preferably, the reversible fuel is selected from the group consisting of $Zn^{II}/Zn$, $Cr^{III}/Cr^{II}$, $Fe^{II}/Fe$, $V^{III}/V^{II}$, and $Ni^{II}/Ni$, and most preferably $Zn^{II}/Zn^0$.

In one embodiment, the positive electrode of the redox flow battery as described herein comprises at least one cathode catalyst. The cathode catalyst is selected from the group consisting of glassy carbon, graphite, carbon black, charcoal, oxidatively treated (via plasma, electrochemical, or acid etching) variants of these carbon polymorphs, Au, Pd, Ag, Pt, Ni, Ir, Ru, Rh, alloys of Au, Pd, Ag, Pt, Ni, Ir, Ru, Rh comprising at least 50% of Au, Pd, Ag, Pt, Ni, Ir, Ru, Rh and mixtures thereof. Preferably the cathode catalyst is selected from the group consisting of glassy carbon, graphite, carbon black, charcoal, oxidatively treated variants of these carbon polymorphs, or Au. Most preferably the cathode catalyst is Au.

In some embodiments, the redox flow battery as described herein comprises at least at least two separated cathode catalysts. Preferably the catalysts are electrically-separated. The first cathode catalyst may be suitable for $Cr_2O_7^{2-}$ reduction (discharge) and the second catalyst may be suitable for high-potential oxidation (recharge) of the mediator. The reduction (discharge) catalyst may be physically inserted and removed from catholyte, preferably the reduction (discharge) catalyst is inserted and removed via automated actuators. The high-potential oxidation (recharge) catalyst may likewise, alternatively or in addition, be physically inserted and removed from the catholyte, preferably the high-potential oxidation (recharge) catalyst is inserted and removed via automated actuators.

In a specific embodiment, the cathode of the redox flow battery described herein is during reduction (discharge) periodically pulsed to low potentials to remove any precipitates or impurities that may have accumulated at the cathode.

In a further aspect, a method for storing electrical energy is provided, which comprises:
a) circulating an electrolyte through a flow channel of a positive half-cell in the redox flow battery described herein,
b) supplying a current power source to the positive electrode of said redox flow battery,
c) using an electrochemically reversible electron mediator that is heterogeneously oxidized by the cathode to homogeneously oxidize $Cr^{3+}$ to $Cr_2O_7^{2-}$ without concurrently oxidizing water.

In preferred embodiments of this aspect, the electrolytes and electron mediators are selected from those described in more detail herein above.

In another aspect, the present invention relates to the use of the redox flow battery as described herein to store electrical energy for grid-level energy storage, homeowner energy storage, remote locations, firming or load leveling of intermittent renewable electricity generation site, preferably wind and solar farms, micro-hydropower, geothermal energy, tidal power, energy arbitrage, portable and/or personal electronics, electric vehicles such as ships, submarines, planes, unmanned underwater vehicles (UUVs) or unmanned aerial vehicles (UAVs), military electronics equipment, satellites and other manned or unmanned spacecraft, or other applications where rechargeable RFBs can be beneficially employed.

Those of skill in the art will realize that many modifications and variations can be employed without departing from the spirit and scope of the invention. The present invention is now further illustrated by reference to the following, non-limiting examples.

EXAMPLES

To demonstrate proof-of-concept for the mediated regeneration of $Cr_2O_7^{2-}$, the $Ce^{4+}/Ce^{3+}$ redox couple was used for the EM, and three demonstrations were performed to provide evidence for the successful operation of the invention.

Example 1

The $EC_{cat}$ mechanism involving the reaction of $Cr^{3+}$ with $Ce^{4+}$ to produce $Ce^{3+}$ was demonstrated via cyclic voltammetry (CV) in the potential window of +0.2 to +1.5 V vs. Ag/AgCl.

Figure 5:
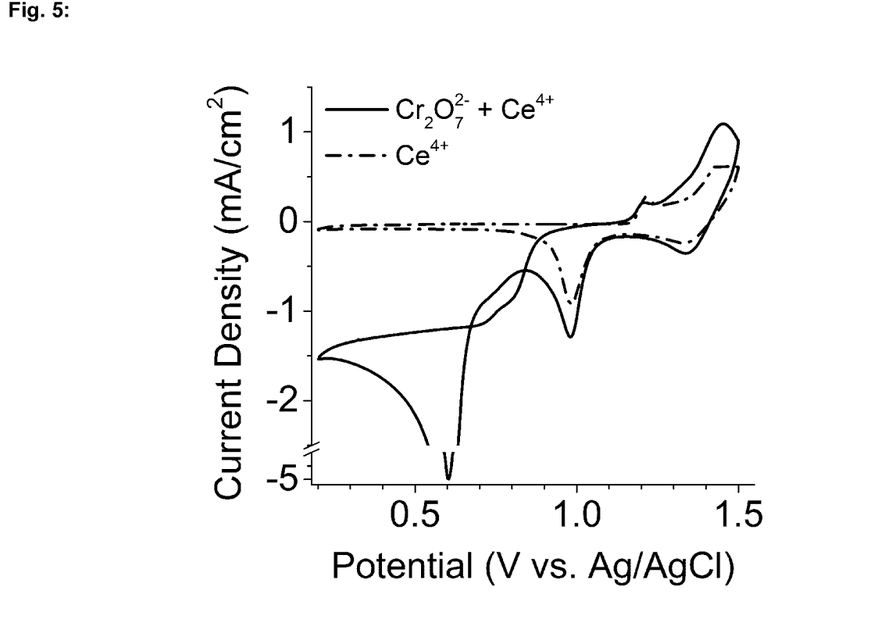
FIG. 5: Cyclic voltammetry (CV) of (1) a mixed solution of 5 mM $Cr_2O_7^{2-}$ and 5 mM $Ce^{4+}$ (solid), and (2) a single-species solution of 5 mM $Ce^{4+}$ (dash-dot) both at Au in 0.5 M $H_2SO_4$ at 50 mV/s.

FIG. 5 shows two cases: solutions of (1) 5 mM $Ce^{4+}$ and 5 mM $Cr_2O_7^{2-}$ and (2) 5 mM $Ce^{4+}$, both in aqueous 0.5 M $H_2SO_4$ at a flat/smooth Au electrode. In FIG. 5, solutions (1) and (2) show a peak for the oxidation of $Ce^{3+}$ in the anodic (positive-going) scans at +1.44 V, with oxidizing current beginning above +1.35 V, and show a peak for the reduction of $Ce^{4+}$ in the cathodic (negative-going) scans at +1.35 V, with net reduction current beginning at +1.40 V. In the CVs, there is no $Ce^{3+}$ present in bulk solution, and all detected $Ce^{3+}$ originates from $Ce^{4+}$ reduction. Generally, the generated $Ce^{3+}$ will diffuse into bulk solution, but the process is slow and some $Ce^{3+}$ remains in the depletion region near the electrode surface to be detected in the anodic scans. The $Ce^{3+}$ is generated while the CVs scan below +1.40 V in the cathodic scans and below +1.35 V in the anodic scans.

Since solutions (1) and (2) spend the same amount of time in the potential range where $Ce^{3+}$ is generated from $Ce^{4+}$, the null hypothesis for lack of interaction between $Cr^{3+}$ and $Ce^{4+}$ would be that solutions (1) and (2) should have generated the same amount of $Ce^{3+}$ for detection in the anodic sweep. However, solution (1) has nearly double the peak current for $Ce^{3+}$ oxidation at +1.44 V. This is attributable to reduction of $Ce^{4+}$ by $Cr^{3+}$, the latter of which is generated from $Cr_2O_7^{2-}$ reduction below +0.9 V in both the anodic and cathodic sweeps.

Figure 6:
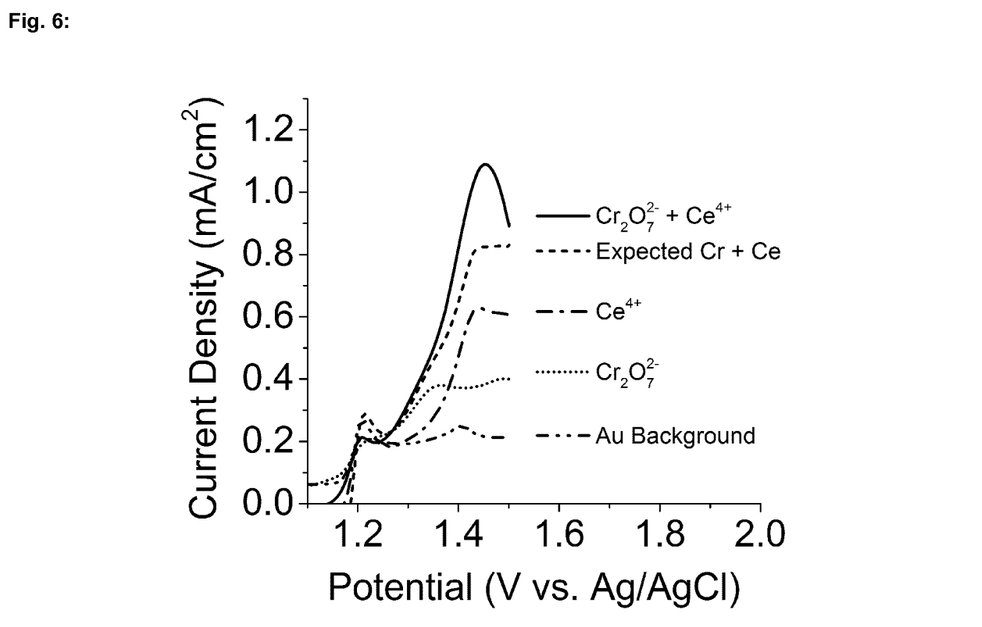
FIG. 6: Cyclic voltammetry (CV) of (1) a mixed solution of 5 mM $Cr_2O_7^{2-}$ and 5 mM $Ce^{4+}$ (solid); (2) 5 mM $Ce^{4+}$ (dash-dot); (3) 5 mM $Cr_2O_7^{2-}$ (dotted); (4) electrolyte only (dash-double-dotted); and (5) expected current from a mixed solution of 5 mM $Cr_2O_7^{2-}$ and 5 mM $Ce^{4+}$ when factoring in a background correction for Au (dashed), all at Au in 0.5 M $H_2SO_4$ at 50 mV/s.

To preclude the possibility of artifacts in the above result, the contribution of current from Cr species in the vicinity of $Ce^{3+}$ oxidation (>+1.35 V) was assessed using a series of control data. In FIG. 6, the anodic scans of CVs are shown for (1) 5 mM $Ce^{4+}$ and 5 mM $Cr_2O_7^{2-}$; (2) 5 mM $Ce^{4+}$; (3) 5 mM $Cr_2O_7^{2-}$; and (4) Au in the absence of $Ce^{4+}$ or $Cr_2O_7^{2-}$, all in 0.5 M $H_2SO_4$. The anodic scan of Au (4) shows a roughly linear current region at potentials >+1.2 V. Since all of the anodic scans have the same Au background current, Au's linear current region was used as an approximate baseline. Anodic scan (5) represents a summation of anodic scans (2) and (3), with one baseline from (4) subtracted. Thus the resulting scan (5) has only one baseline, rather than a summation of two baselines from (2) and (3), for better comparison to (1). The anodic scan in (5) accounts for only half of the increase in the $Ce^{3+}$ oxidation peak seen in (1) vs. (2). The additional current in (1) is clearly attributable to the $EC_{cat}$ process.

Example 2

Figure 7:
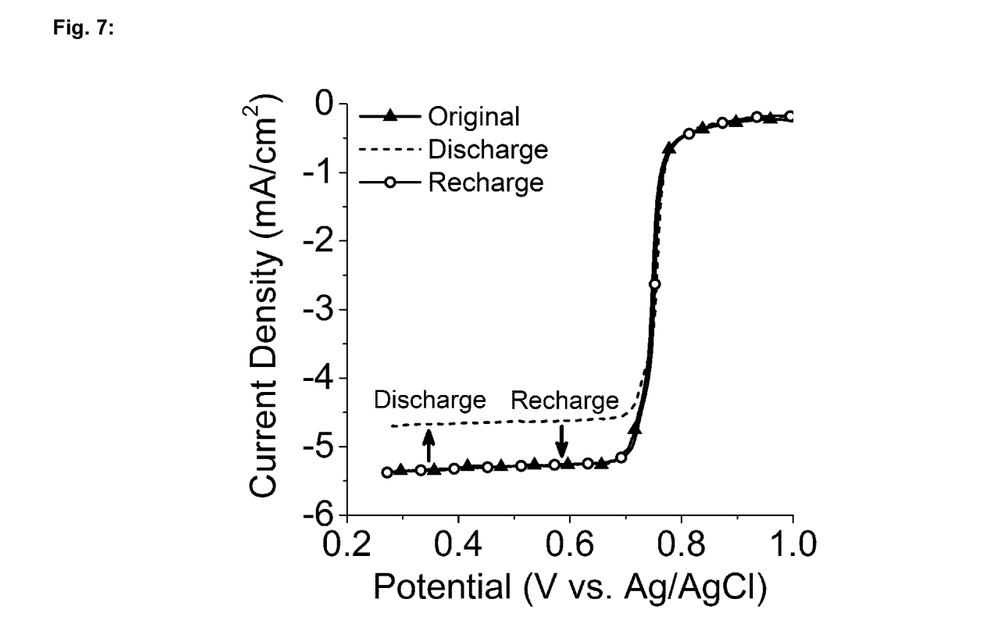
FIG. 7: RDE voltammetry of a mixed solution of 2.5 mM $Cr_2O_7^{2-}$ and 2.5 mM $Ce^{4+}$ showing (1) original current (solid with triangle); (2) current after a 2.5 C discharge (dashed); and (3) current following a 2.5 C recharge (solid with circle), all at Au in 0.5 M $H_2SO_4$ at 250 rpm, 50 mV/s.

A discharge/recharge cycle of $Cr_2O_7^{2-}$ and $Ce^{4+}$ solution was demonstrated to fully restore the original $Cr_2O_7^{2-}$ reduction current. FIG. 7 shows RDE voltammetry of a solution of 2.5 mM $Cr_2O_7^{2-}$ and 2.5 mM $Ce^{4+}$ in 0.5 M $H_2SO_4$ at 250 rpm, with $Cr_2O_7^{2-}$ reduction occurring at potentials <+0.9 V. RDE voltammograms are shown for three cases: (1) prior to discharge; (2) after a (non-total) 2.5 C discharge of $Cr_2O_7^{2-}$ at 4000 rpm; and (3) after 2.5 C recharge of $Cr^{3+}$ at 4000 rpm. The mass transport limited currents in (1) and (3) match, showing full restoration of the original $Cr_2O_7^{2-}$ concentration.

Example 3

Figure 8:
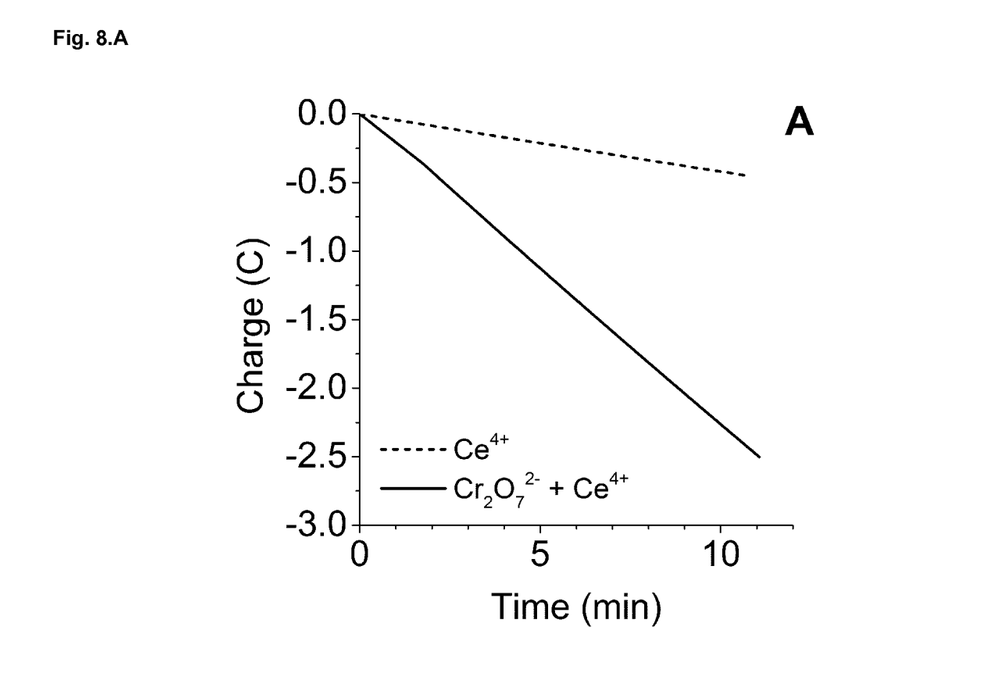
FIG. 8A: Chronocoulometry during discharge of (1) 2.5 mM $Ce^{4+}$ (dashed) and (2) 2.5 mM 2.5 mM $Cr_2O_7^{2-}$ and 2.5 mM $Ce^{4+}$ (solid), both at Au in 0.5 M $H_2SO_4$ at 4000 rpm.
FIG. 8B: Chronocoulometry during recharge of 2.5 mM $Cr_2O_7^{2-}$ and 2.5 mM $Ce^{4+}$ at Au in 0.5 M $H_2SO_4$ at 4000 rpm. Inset: Comparative chronocoulometry during recharge of (1) 2.5 mM $Ce^{4+}$ (dashed) and (2) 2.5 mM 2.5 mM $Cr_2O_7^{2-}$ and 2.5 mM $Ce^{4+}$ (solid), both at Au in 0.5 M $H_2SO_4$ at 4000 rpm.

The $Cr^{3+}$ recharge in Demonstration 3 was observed to occur via the expected asymmetric, $EC_{cat}$ process. FIG. 8.A shows that the 2.5 C discharge (negative current and charge) occurred rapidly, taking only 11 min, while the recharge in FIG. 8.B required 12 h 30 min. The $EC_{cat}$ recharge of $Cr^{3+}$ via $Ce^{4+}$ still occurred faster than simply recharging $Ce^{4+}$ from $Ce^{3+}$, as expected for an $EC_{cat}$ reaction. This was demonstrated by discharging a solution of 2.5 mM $Ce^{4+}$ in 0.5 M $H_2SO_4$ at 4000 rpm for 11 min (FIG. 8.A) and recharging $Ce^{3+}$ to $Ce^{4+}$ at the same potential and rpm used in Demonstration 3 (FIG. 8.B, inset). Current for $Ce^{3+}$ oxidation is 2.5 times greater when $Cr^{3+}$ is also present in solution.

These three demonstrations clearly support the functionality of the mediated regeneration of $Cr_2O_7^{2-}$. Additional aspects of the invention relate to further defining the optimal operation and characteristics of $Cr_2O_7^{2-}$ RFBs.

In the above demonstrations, EM $Ce^{4+}$ is used to demonstrate the $EC_{cat}$ method of $Cr_2O_7^{2-}$ recharge. Various embodiments of the invention may make use of a multitude of EMs with standard electrochemical potentials ($E^0$) similar to that of the $Cr^{3+}/Cr_2O_7^{2-}$ redox couple, specifically $E^0$ up to 0.250 V negative that of $Cr^{3+}/Cr_2O_7^{2-}$ ($E^0$=+1.23 V vs. NHE, +1.03 V vs. Ag/AgCl) and any potential positive that of $Cr^{3+}/Cr_2O_7^{2-}$ before the onset of copious $H_2O$ oxidation at a given electrocatalyst material. For Au and carbon-based electrodes, this includes EMs with $E^0$ specifically from +0.98 to +1.80 V vs. NHE and +0.78 to +1.60 V vs. Ag/AgCl. Typically, a mediator should be chosen that has $E^0$ positive of the $E^0$ for $Cr^{3+}/Cr_2O_7^{2-}$ in order to effectively oxidize $Cr^{3+}$ to $Cr_2O_7^{2-}$. However, electrode mediators with $E^0$ negative of $Cr^{3+}/Cr_2O_7^{2-}$ may be employed since a given mediators E will shift positive of its $E^0$ at a high ratio of oxidized to reduced mediator, as described by the Nernst equation. During recharge of the $Cr_2O_7^{2-}$ RFB, it is expected that 99 to 99.995% of the EM will exist in the oxidized form, causing the EM's $E^0$ to shift positive by 0.120 to 0.250 V. Thus EMs with $E^0$ up to 0.250 V lower than the $E^0$ of $Cr^{3+}/Cr_2O_7^{2-}$ can still effectively oxidize $Cr^{3+}$ to $Cr_2O_7^{2-}$.

While it would seem that the EM should also have an $E^0$ lower than that of the $O_2/H_2O$ redox couple ($E^0$=+1.23 V vs. NHE) to avoid oxidizing aqueous solutions, the vast majority of EMs are not capable of oxidizing $H_2O$ at the $E^0$ for $O_2/H_2O$. The same is true for solid-state electrode materials. This is because $H_2O$ oxidation to $O_2$ is a complex reaction requiring specific catalysts to proceed efficiently. For this reason, neither Au nor most carbon-based electrode materials can perform significant oxidation of $H_2O$ until potentials of +1.800 V vs. NHE or higher, allowing a wide potential range where many possible EMs may oxidize $Cr^{3+}$ to $Cr_2O_7^{2-}$.

While prior art, such as Grenet cells, used carbon-based cathodes for $Cr_2O_7^{2-}$, it is demonstrated that reduction of $Cr_2O_7^{2-}$ occurs at far higher $E_{1/2}$ (higher voltage) at Au cathodes (FIG. 4), and thus Au cathodes are proposed for $Cr_2O_7^{2-}$ RFBs. Indeed, Au also outperforms Ag, Pt, Pd, and Ni.

Figure 9:
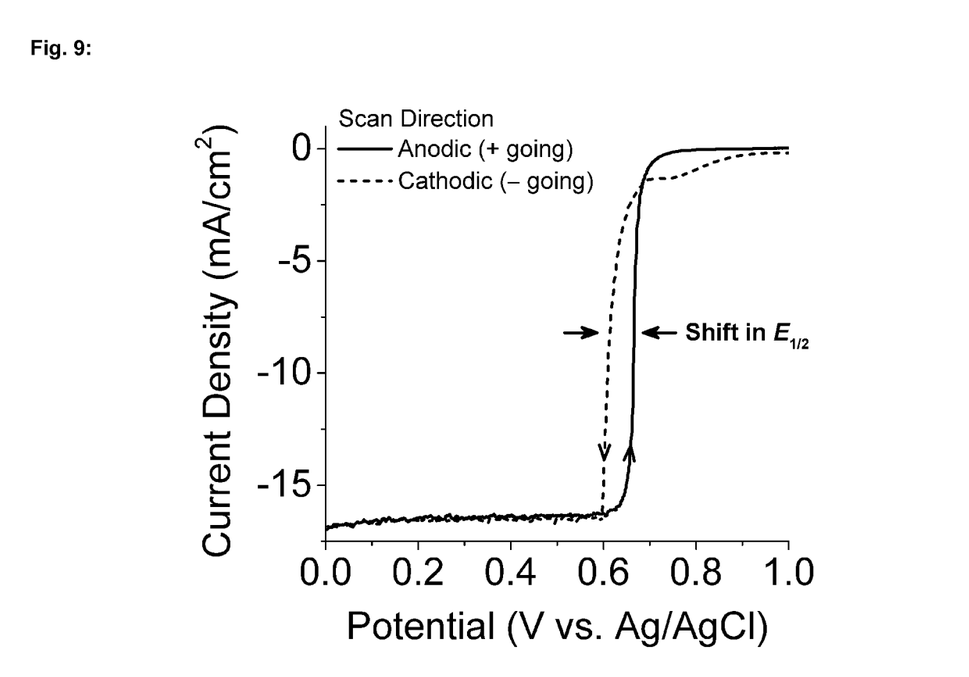
FIG. 9: RDE voltammetry of 5 mM $Cr_2O_7^{2-}$ showing the anodic (solid) and cathodic (dashed) scans at Au in 0.5 M $H_2SO_4$ at 1000 rpm, 50 mV/s.

A blocking species (surface oxide, "poison", or precipitate) that impairs $Cr_2O_7^{2-}$ reduction seems to develop at higher potentials at the Au cathode. This is evidenced by the high hysteresis between the anodic and cathodic scans in the RDE voltammograms in FIG. 9, with higher $E_{1/2}$ (higher voltage) for $Cr_2O_7^{2-}$ reduction observed in the anodic scan. That is, if the Au cathode has temporarily experienced potentials higher than the onset of $Cr_2O_7^{2-}$ reduction, which occurs at the beginning of a cathodic scan, the $E_{1/2}$ for $Cr_2O_7^{2-}$ reduction is lower than if the cathode has temporarily experienced potentials lower than the onset of $Cr_2O_7^{2-}$ reduction. This implies that potentials lower than the onset of $Cr_2O_7^{2-}$ reduction remove the blocking species and allow higher $E_{1/2}$ (higher voltage). To ensure more efficient discharge at higher voltage, it is proposed to simply step the electrode potential to low potentials (specifically 0≤E≤+0.6 V vs. Ag/AgCl) to remove the blocking species. Such potential-step based cleaning techniques have been developed previously by the author for $BH_4^-$ (Finkelstein et al., "Self-poisoning during $BH_4^-$ oxidation at Pt and Au, and in situ poison removal procedures for $BH_4^-$ fuel cells. *J. Phys. Chem. C* 2013, 117, 1571-1581), and $NH_3$. These pulse-based techniques operate by simulating the change in the electrode potential that occurs during RDE voltammetry that causes the hysteresis between anodic and cathodic scans described above.

Au tends to etch/dissolve at the high potentials necessary for $Cr^{3+}$ oxidation. Hence, the present invention also proposes the optional use of dual cathode materials: Au for $Cr_2O_7^{2-}$ reduction, and a second material stable at high potential (Pt, Pd, Ni, carbon, and others) for $Cr^{3+}$ oxidation. In some embodiments of the invention, the Au cathode material is physically removed from the catholyte during $Cr^{3+}$ oxidation to avoid subjecting it to potentially damaging high potentials.

Various disclosures of the present invention may make use of a number of reversible anodic half-cell chemistries to complement the described $Cr_2O_7^{2-}$ cathodic chemistry. That is, the invention describes a cathodic half-cell chemistry that may be paired with many different anodic chemistries to form a complete electrochemical cell. It has already been established that the $Zn^{2+}/Zn$ anode is compatible with $Cr_2O_7^{2-}$. Other proven and experimental anode chemistries are also likely to operate well with $Cr_2O_7^{2-}$, including $Fe^{3+}/Fe^{2+}$, $Fe^{2+}/Fe$, $Cu^{2+}/Cu^+$, $Cu^+/Cu$, $H^+/H_2$, $V^{3+}/V^{2+}$, $Cr^{2+}/Cr$, $Al^{3+}/Al$, $Zr^{4+}/Zr$, $Co^{2+}/Co$, $Ni^{2+}/Ni$, $Cd^{2+}/Cd$, $In^{3+}/In^{2+}$, $In^{2+}/In^+$, $In^+/In$, $In^{3+}/In$, $In^{2+}/In$, $Ga^{3+}/Ga^+$, $Ga^+/Ga$, $Ga^{3+}/Ga$, $Sn^{2+}/Sn$, $Sn^{4+}/Sn^{2+}$, $Sb^{3+}/Sb$, $Pb^{2+}/Pb$, $Li^+/Li$, $Na^+/Na$, and the anthraquinone 2,6-disulfonate/dihydroxyanthraquinone 2,6-disulfonate redox couple.

The invention claimed is:

1. A rechargeable redox flow battery comprising an electrochemical cell comprising: at least one positive electrode in a positive half-cell and a negative electrode in a negative half-cell,
   an ion-conducting membrane between the two half-cells, wherein the membrane is designed for dual acidic anolyte and catholyte or designed for an acidic anolyte and an alkaline catholyte;
   at least two storage tanks for catholyte and anolyte,
   one or more pumps to circulate stored catholyte and anolyte through the cathodic and anodic half cells, respectively, and
   at least one anolyte and at least one catholyte;
   wherein the anolyte comprises at least one fuel capable of reversible oxidation, at least one electrolyte for conductivity and at least one solvent; and
   the catholyte comprises the $Cr^{III}/Cr^{VI}$ redox couple, at least one electrolyte for conductivity, at least one solvent and at least one electrochemically reversible electron mediator,
   wherein said electron mediator is capable of homogeneously oxidizing $Cr^{III}$ to $Cr^{VI}$ using an $EC_{cat}$ mechanism in solution.

2. The redox flow battery according to claim 1, wherein the electron mediator has a standard electrode potential (E0) from +0.980 to +1.800 V.

3. The redox flow battery according to claim 1, wherein the electron mediator is selected from the group consisting of:
   $Ce^{4+}/Ce^{3+}$;
   $Ru(bipy)_3^{3+}/Ru(bipy)_3^{2+}$, wherein bipy is 2,2'-dipyridine and/or 2,2'-dipyridine substituted with one or more substituents chosen from the group consisting of fluoro, chloro, bromo, hydroxy, nitro, fluoroalkyl, fluoroalkoxy, fluoroaryl, cyano, alkoxy, carboxy, —OC(=O)R$^0$, —SO$_3^{2-}$, —SO$_2$X or —C(=O)—X, wherein X is hydrogen, $C_1$-$C_6$ alkyl, —OR$^1$, fluoroalkyl or NR$^2$R$^3$, wherein R$^0$, R$^1$, R$^2$, and R$^3$ are each independently hydrogen, $C_1$-$C_6$ alkyl, $C_5$-$C_7$cycloalkyl, fluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy or cyano, with the proviso that the optionally substituted 2,2'-dipyridine has a more positive reduction potential than E$^0$=+1.24 V vs. NHE;
   $Ru(phen)_3^{3+}/Ru(phen)_3^{2+}$, wherein phen is 1,10-phenanthroline and/or 1,10-phenanthroline substituted with one or more substituents chosen from the group consisting of fluoro, chloro, bromo, hydroxy, nitro, fluoroalkyl, fluoroalkoxy, fluoroaryl, cyano, alkoxy, carboxy, —OC(=O)R$^0$, —SO$_3^{2-}$, —SO$_2$X or —C(=O)—X, wherein X is hydrogen, $C_1$-$C_6$ alkyl, fluoroalkyl or NR$^2$R$^3$, wherein R$^0$, R$^1$, R$^2$, and R$^3$ are each independently hydrogen, $C_1$-$C_6$ alkyl, $C_5$-$C_7$cycloalkyl, fluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, perfluoroalkyl, fluoroalkoxy, cyano, wherein the optionally substituted 1,10-phenanthroline has a more positive reduction potential than E$^0$=+1.20 V vs. NHE;
   $Fe(phen)_3^{3+}/Fe(phen)_3^{2+}$; wherein phen is 1,10-phenanthroline and/or 1,10-phenanthroline substituted with one or more substituents chosen from the group consisting of fluoro, chloro, bromo, hydroxy, nitro, fluoroalkyl, fluoroalkoxy, fluoroaryl, cyano, alkoxy, carboxy, —OC(=O)R$^0$, —SO$_3^{2-}$, —SO$_2$X or —C(=O)—X, wherein X is hydrogen, $C_1$-$C_6$ alkyl, —OR$^1$, perfluoroalkyl or —NR$^2$R$^3$, wherein R$^0$, R$^1$, R$^2$, and R$^3$ are each independently hydrogen, $C_1$-$C_6$ alkyl, $C_5$-$C_7$ cycloalkyl, fluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy, cyano, wherein the optionally substituted 1,10-phenanthroline has a more positive reduction potential than E$^0$=1.15 V vs. NHE;
   $Fe(bipy)_3^{3+}/Fe(bipy)_3^{2+}$; wherein bipy is 2,2'-dipyridine and/or 2,2'-dipyridine substituted with one or more substituents chosen from the group consisting of fluoro, chloro, bromo, hydroxy, nitro, fluoroalkyl, fluoroalkoxy, fluoroaryl, cyano, alkoxy, carboxy, —OC(=O)R$^0$, —SO$_3^{2-}$, —SO$_2$X or —C(=O)—X, wherein X is hydrogen, $C_1$-$C_6$ alkyl, fluoroalkyl or —NR$^2$R$^3$, wherein R$^0$, R$^1$, R$^2$, and R$^3$ are each independently hydrogen, $C_1$-$C_6$ alkyl, $C_5$-$C_7$ cycloalkyl, fluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy, cyano, wherein the optionally substituted 2,2'-dipyridine has a more positive reduction potential than E$^0$=+1.03 V vs. NHE;
   $Fe(PR_3)_5^{3+}/Fe(PR_3)_5^{2+}$, wherein R is chosen from the group consisting of fluoro, chloro, bromo, hydroxy, nitro, fluoroalkyl, fluoroalkoxy, fluoroaryl, cyano, alkoxy, carboxy, —OC(=O)R$^0$, —SO$_3^{2-}$, —SO$_2$X or —C(=O)—X, wherein X is hydrogen, $C_1$-$C_6$ alkyl, —OR$^1$, fluoroalkyl or —NR$^2$R$^3$, wherein R$^0$, R$^1$, R$^2$, and R$^3$ are each independently hydrogen, $C_1$-$C_6$ alkyl, $C_5$-$C_7$ cycloalkyl, fluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy, cyano, preferably R is pentafluorobenzene;
   $Fe(CO)_x(PR)_{5-x}^{3+}/Fe(CO)_x(PR)_{5-x}^{2+}$, wherein R is chosen from the group consisting of fluoro, chloro, bromo, hydroxy, nitro, fluoroalkyl, fluoroalkoxy, fluoroaryl, cyano, alkoxy, carboxy, —OC(=O)R$^0$, —SO$_3^{2-}$, —SO$_2$X or —C(=O)—X, wherein X is hydrogen, $C_1$-$C_6$ alkyl, —OR$^1$, fluoroalkyl or —NR$^2$R$^3$, wherein R$^0$, R$^1$, R$^2$, and R$^3$ are each independently hydrogen, $C_1$-$C_6$ alkyl, $C_5$-$C_7$ cycloalkyl, fluoroalkyl, phenyl, substituted phenyl, wherein said phenyl substituents are $C_1$-$C_6$ alkyl or $C_1$-$C_6$ alkoxy, fluoro, chloro, bromo, hydroxy, nitro, fluoroalkyl, fluoroalkoxy, cyano, preferably R is pentafluorobenzene; and wherein x is 1 to 4;
   $Fe(CO)_x^{3+}/Fe(CO)_x^{2+}$, wherein x is 1 to 4;

$Cr(\eta^6-C_6R_xH_{6-x})_2$, wherein R is sulfonate ($-SO_3^-$) and x is 0 to 6;

$Cr(CO)_4(P(OC_6R_xH_{5-x})_3)_2$, wherein R is sulfonate ($-SO_3^+$) and x=0 to 5;

$Cr(CO)_4(P(OCH_2R)_3)_2$, wherein R is sulfonate ($-SO_3^-$) or hydroxyl ($-OH$);

and mixtures thereof.

4. The redox flow battery according to claim 1, wherein the catholyte is a liquid comprising at least one electrochemically reversible electron mediator, an electrolyte for conductivity and pH control, including a strong acid with a pKa of 2 or less, or simply an electrolyte for conductivity; and a solvent.

5. The redox flow battery according to claim 1, wherein the anolyte is a liquid comprising a solution of a fuel capable of reversible oxidation, an electrolyte for conductivity and pH control, including a strong acid with a pKa of 2 or less, or simply an electrolyte for conductivity; and a solvent selected from the group consisting of water, acetonitrile, dimethylsulfoxide, dimethylformamide, methanol, ethanol, 1-propanol, isopropanol, ether, diglyme, tetrahydrofuran, glycerol, and mixtures thereof.

6. The redox flow battery according to claim 1, wherein the reversible fuel is a liquid comprising a redox couple selected from the group consisting of $Zn^{II}/Zn$; $H^-/H_2$; $V^{III}/V^{VI}$; $Cr^{II}/Cr$; $Cr^{III}/Cr^{II}$; $Al^{III}/Al$; $Zr^{IV}/Zr$; $Co^{II}/CO$; $Ni^{II}Ni$; $Cd^{II}/Cd$; $In^{III}/In^{II}/In^I/In$; $Ga^{III}/Ga^I/Ga$; $Sn^{II}/Sn$; $Sn^{IV}/Sn^{II}$; $sb^{III}/Sb$; $Pb^{II}/Pb$; $Li^I/Li$; $Na^I/Na$; the oxidized conjugates of anthraquinone 2,6-disulfonate, the reduced conjugates of anthraquinone 2,6-disulfonate, and mixtures thereof.

7. The redox flow battery according to claim 1, wherein the positive electrode comprises at least one cathode catalyst;

wherein said cathode catalyst is selected from the group consisting of glassy carbon, graphite, carbon black, charcoal, Au, Pd, Ag, Pt, Ni, Ir, Ru, Rh, alloys of Au, Pd, Ag, Pt, Ni, Ir, Ru, Rh comprising at least 50% of Au, Pd, Ag, Pt, Ni, Ir, Ru, Rh and mixtures thereof.

8. The redox flow battery according to claim 7, comprising at least two separated cathode catalysts, the catalysts are electrically-separated.

9. The redox flow battery according to claim 8, wherein the first cathode catalyst is suitable for $Cr_2O_7^{2-}$ reduction (discharge) and the second is suitable for the high-potential oxidation (recharge) of the mediator.

10. The redox flow battery according to claim 9, wherein the first cathode catalyst is physically insertable and removable from the catholyte.

11. The redox flow battery according to claim 9, wherein the second cathode catalyst is physically insertable and removable from the catholyte.

12. The redox flow battery according to claim 1, wherein the cathode, during reduction (discharge), is periodically pulsable to low potentials to remove any precipitates or impurities that may have accumulated at the cathode.

13. A method to store electrical energy for grid-level energy storage, homeowner energy storage, remote locations, firming or load leveling of intermittent renewable electricity generation site, micro-hydropower, geothermal energy, tidal power, energy arbitrage, portable and/or personal electronics, electric vehicles such as ships, submarines, planes, unmanned underwater vehicles (UUVs), unmanned aerial vehicles (UAVs), military electronics equipment, satellites and other manned or unmanned spacecraft, or other applications where rechargeable redox flow batteries can be beneficially employed, comprising the step of using the rechargeable redox flow battery according to claim 1.

14. A method for storing electrical energy comprising:
a) circulating an electrolyte through a positive half-cell in the redox flow battery according to claim 1,
b) supplying a current power source to the positive electrode of said redox flow battery,
c) using the at least one electrochemically reversible electron mediator that is heterogeneously oxidized by the cathode to homogeneously oxidize $Cr^{3+}$ to $Cr_2O_7^{2-}$ without concurrently oxidizing water.

* * * * *